Jan. 8, 1963 W. BEER 3,071,982
TRANSMISSION FOR MACHINE TOOLS
Filed Sept. 8, 1960 4 Sheets-Sheet 1

Jan. 8, 1963 W. BEER 3,071,982
TRANSMISSION FOR MACHINE TOOLS
Filed Sept. 8, 1960 4 Sheets-Sheet 2
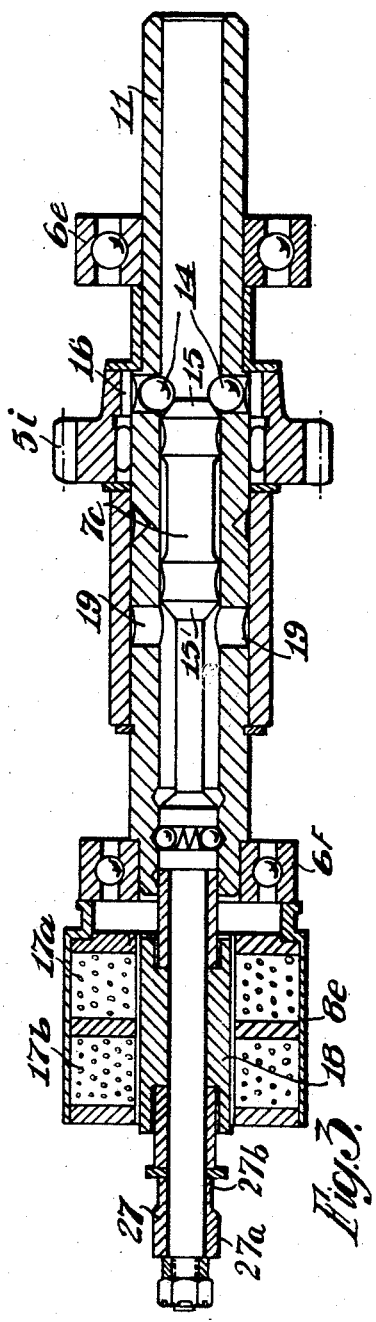
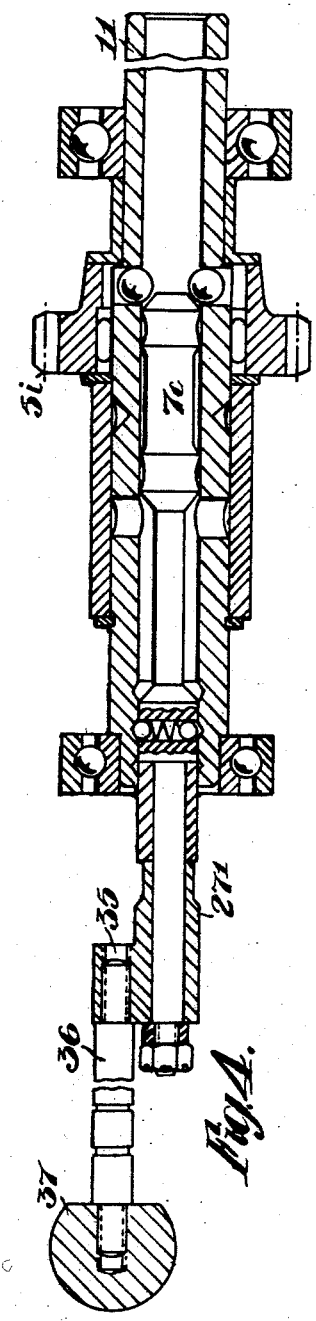

Jan. 8, 1963 W. BEER 3,071,982
TRANSMISSION FOR MACHINE TOOLS
Filed Sept. 8, 1960 4 Sheets-Sheet 3

United States Patent Office 3,071,982
Patented Jan. 8, 1963

3,071,982
TRANSMISSION FOR MACHINE TOOLS
Wilhelm Beer, Dotzheim, Wiesbaden, Germany, assignor of one-half to Crossley Brothers Limited, Manchester, England, a British company
Filed Sept. 8, 1960, Ser. No. 54,799
Claims priority, application Germany Sept. 12, 1959
7 Claims. (Cl. 74—359)

The invention relates to control gears for machine tools, especially lathes, such as are used more particularly for automatic programming.

In the past, the practice has been to use, for machine tools, toothed wheel gears with which, for the individual food stages, separate toothed wheels rotatable on their respective shafts would be coupled to the shafts by means of driving keys. Here the driving key engaged, with its spring, directly in the corresponding slot of the toothed wheel itself, the disadvantage of this being that the key coupling would be flattened out very quickly and consequently the equipment was only short lived. With other known feed control gears for machine tools the toothed wheels are mounted for axial movement on the individual gear shafts and are brought into mesh with their counter wheel by axial displacement. These gears suffer from the disadvantage that engagement of the individual gears can only take place with the gear at rest, which, in each case, requires the gear to be de-clutched from the shaft.

In more recent times certain types of control gears have become known for motor vehicles in which—mounted on parallel spindles—fixed, and loose toothed wheels capable of being coupled to the latter as required, are fitted, and the loose toothed wheels are engaged by means of driving keys indirectly through the intermediary of drop-in balls. Here, the driving keys are located in axial drillings in the shafts and the loose toothed wheels have, along their inner drillings recesses in which the balls—pressed outwards radially by the driving key—engage, and thereby establish the lock between the shaft and the toothed wheel. However, these gears, as is customary with motor vehicles, only have three or four speeds and for this reason are, in themselves, not suitable for machine tools where a considerably larger number of gear ratios are demanded.

Now, the invention is based on the surprising consideration that these gears—in themselves only known to be in use for motor vehicles—can be converted into gears suitable for machine tools by the addition of simple components, and this more particularly when several such three-speed or four-speed gears are coupled together.

In accordance with the invention this is achieved in that there is connected either in front or to the rear of an—in itself well-known—three-speed or four-speed gear with—mounted on parallel spindles—fixed and loose toothed wheels capable of being coupled to the latter at option, an output or input shaft on which at least one toothed wheel is freely rotatably mounted and is capable of being coupled to the shaft.

The number of freely rotatable toothed wheels mounted on the supplementary shaft depends on whether only one three-speed or four-speed gear assembly is used, or several of these. In the first instance there are mounted on the supplementary shaft two freely rotatable toothed wheels which are in mesh with the two fixed wheels of the adjacent shaft and which are capable of being coupled, as required, with the supplementary shaft. If the gear assembly—in itself quite a well known one—has four speeds, then when the one freely rotatable toothed wheel on the supplementary shaft is engaged, four different gear ratios are produced; if the other freely rotatable toothed wheel is engaged a further four gear ratios are obtained, or in other words a total of eight gear ratios. Since however, one or two of the speeds will co-incide, six to seven different gear ratios are available for all practical purposes. For machine tools with a relatively small operational programme such a feed control gear is very advantageous.

With another form of the invention there may be mounted between two of the—in themselves known—three or four speed gear assemblies with fixed and freely rotatable gear wheels a supplementary shaft on which is mounted a freely rotatable toothed wheel which may be selectively coupled to the supplementary shaft and is in mesh with two fixed toothed wheels on the adjacent gear assembly shafts. Where this arrangement is used it is preferable for the two three or four speed gear assemblies to be located symmetrically on opposite sides of the supplementary shaft. By means of an arrangement such as this, four times four, i.e. sixteen different gear ratios are theoretically obtained; since however once again, as a result of equal or similar transmission ratios, for all practical purposes thirteen different gear ratios are obtained. Here the outer-most shaft of one gear assembly serves as an input shaft, and the outer-most shaft of the other gear assembly serves as an output shaft. While the freely rotatable wheel on the supplementary shaft is uncoupled from the shaft, the supplementary shaft remains stationary and the freely rotatable wheel merely establishes the driving connection between the two gear assemblies. If however, the freely rotatable toothed wheel on the supplementary shaft is coupled to the latter while, at the same time the three or four speed gear located at the output end is uncoupled, the output can be taken from the supplementary shaft, and in this manner, depending on the setting of the input gear assembly, four further gear ratios are obtained and since these are of a higher speed, they are capable of being used to advantage as high speed stages in a lathe or other type of machine tool. Altogether therefore the combination of two four speed gear assemblies supplies by means of a supplementary, shaft and toothed wheel, thirteen feed stages and four high speed stages.

In order to provide a high speed power take-off from the supplementary shaft, it is appropriate for the two three or four speed gear assemblies to be so connected, by means of keys or other clutch means that at any particular time only one of the freely rotatable toothed wheels—capable of being coupled—is locked on its spindle, and the additional shaft—connected in front or to the rear—is connected with a locking action to the known lock of the one gear assembly which permits one of its freely rotatable toothed wheels to be locked on the supplementary shaft only when the two driving keys of this known gear assembly are in their neutral position.

The locking mechanism for the freely rotatable toothed wheels on the supplementary shaft also comprises preferably, a driving key with an end projecting from the shaft and operating in conjunction with the two driving keys of the gear assemblies.

The three-speed or four-speed gear units on which the invention is based are supplied in the trade complete with electromagnetic controls. The combinations formed herefrom in accordance with the invention can likewise be designed so as to be operated electromagnetically by having the locking arrangement for the freely rotatable toothed wheels of the supplementary shaft—and the two drive keys of the three-speed or four-speed gear assemblies also—controlled by magnetic coils acting in a contrary sense. But a mechanical operation of the individual drive keys is also possible. Where such is the case, all the drive keys are controlled by hand by means of one rod each which, with the one end, engages on the drive key stem and projects out of the gearbox at the other end.

The invention will now be further described with reference to the accompanying drawings which illustrate one form of construction cited by way of example.

FIGURE 3 is a longitudinal section through the supplementary shaft and showing an electric control means.

FIGURE 4 is a longitudinal section through the supplementary shaft and showing a hand control means.

Figures 1, 2:
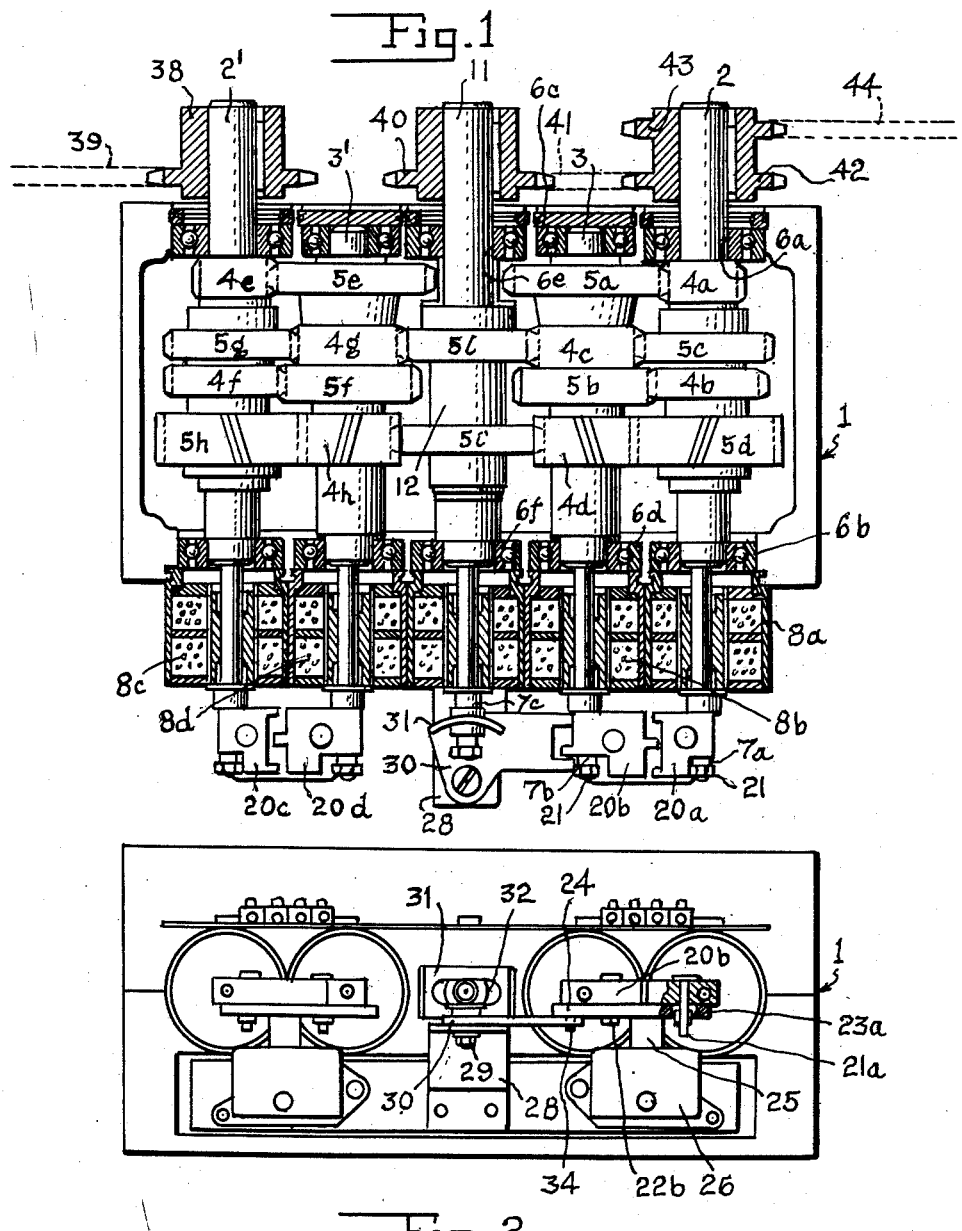
FIGURE 1 is a plan view of a variable speed transmission utilizing two gear assemblies.
FIGURE 2 is an elevational view of the locking or coupling arrangement shown in FIGURE 1.

In the gearbox 1 five gear shafts are arranged parallel to each other in one plane. The power output shaft 2 and countershaft 3 with their fixed toothed wheels 4a, 4b, 4c, 4d and their freely rotatable toothed wheels 5a, 5b, 5c, and 5d and the ball bearings 6a, 6b, 6c and 6d are similar to those utilized in the transmissions of motor vehicles. The drive keys fitted in the drilled holes of the shaft 2 and countershaft 3 are provided with stems 7a and 7b projecting through the boxes 8a and 8b containing the operating magnet coils. The coil boxes with the stem-ends and the locking mechanism associated therewith may be protected by a suitable housing. This provides one gear unit or assembly.

A second gear unit or assembly may be provided in the left hand portion of the gear box 1 and may comprise power input shaft 2' and countershaft 3' to which are fixed toothed wheels 4e, 4f, 4g and 4h which are identical to the fixed toothed wheels 4a, 4b, 4c and 4d on the shafts 2 and 3. Shafts 2' and 3' also carry freely rotatable toothed wheels 5e, 5f, 5g and 5h which are identical to the freely rotatable toothed wheels 5a, 5b, 5c and 5d on the shafts 2 and 3. Suitable bearings are provided for mounting the shafts 2' and 3' in the gear box 1. The shafts 2' and 3' are also provided with drive keys identical with the drive keys in the shafts 2 and 3 and the stems of the keys in shafts 2' and 3' project through boxes 8c and 8d which contain magnet coils for operating the keys. The shaft 2' serves as a power input shaft for the transmission and may be provided with a sprocket 38 engaging a drive chain 39.

Rotatably mounted in the gear box 1 between the gear units or assemblies by means of bearings 6e and 6f, is a supplementary shaft 11 on which is mounted a freely rotatable toothed wheel 5i which is in mesh with the wheel 4c on countershaft 3 and wheel 4g on countershaft 3'. Bushings 12 and 13 serve to retain the wheel 5i in place on the shaft 11.

As can be seen from FIGURE 3 the drive key 7c for the supplementary toothed wheel 5i is located in the hollow shaft 11. In several radial bores in the shaft 11 are disposed the lock balls 14, which are engaged by the front bevel edge 15 of the key 7c. The toothed wheel 5i is provided on its inner surface with several cavities 16 into which, when the drive key 7c moves to the right as viewed in FIG. 3, the balls 14 are pressed, as a result of which the wheel 5i is locked or coupled to the shaft 11. Outwardly of the ball-bearing 6f and located in the box 8e, are the two magnet coils 17a and 17b which are reverse wound or wired, so that, when the coil 17a is excited the armature 18 is pulled to the right and thus coupled the wheel 5i to the shaft 11 and when the coil 17b is excited the armature 18 is pulled to the left to uncouple the wheel 5i from the shaft 11.

When the toothed wheel 5i is uncoupled from the shaft 11 it merely establishes a driving connection between the fixed toothed wheels 4c and 4g, the right and left hand gear units.

The shafts 2 and 3 and 2' and 3' of these gear units are constructed substantially in the same manner as the shaft 11, although in the case of the shafts 2 and 3 and 2' and 3' the radial bores 19 are provided with lock balls 14 which, when the associated drive key moves to the left, are pushed outwards by the bevel edge 15' and engage in corresponding cavities of the loose toothed wheels 4b, 4d, 4f and 4h respectively, so as to couple these wheels to the corresponding shaft. On the stem ends of the drive keys 7a and 7b protruding from the coil boxes 18 as well as on the ends of the keys for the shafts 2' and 3' the locking dogs 20a and 20b, 20c and 20d are secured in place by the nuts 21. The lower end of bolts 22a and 22b carried by the dogs project into slots 23a and 23b of a double-armed lever 24 which is pivotally mounted on a pin 25 in a socket 26 located on the gear housing 1 (see FIGURE 2). This mechanism ensures that the two drive keys 7a and 7b may be disposed simultaneously in a neutral position but when either key is moved to couple the associated gear and shaft the other key is retained in neutral position so that, at any given time only one of the loose toothed wheels 5c to 5d can be coupled to its shaft. The gear unit located in the left hand portion of FIGURE 1 is providing with the same type of mechanism.

It will, therefore be seen that with the wheel 5i free to rotate on the shaft 11 that any one of the wheels 5e or 5f and 5g or 5h may be coupled to the shafts 3' or input shaft 2' respectively and that any one of the wheels 5a or 5b and 5c or 5d may be coupled to the countershaft 3 or output shaft 2 respectively, thereby providing sixteen different gear ratios. Power input to the transmission is by way of the shaft 2' and power output by way of the shaft 2.

If desired and in order to provide additional gear ratios, power output may be by way of supplementary shaft 11 in which case the right hand gear unit or assembly is rendered inoperative for power transmission purposes. Such alternative power output may be directly from the supplementary shaft 11 or if desired, a sprocket 40 may be fixed to the supplementary shaft 11 and connected through a chain 41 to a sprocket 42 fixed to the shaft 2. Power output sprocket 43 is also fixed to shaft 2 and is connected to power output chain 44.

Figure 5:
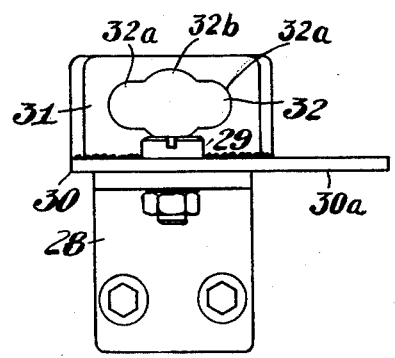
FIGURE 5 is an elevational view showing the blocking device for the supplementary shaft.

Since in this use of the transmission, the output shaft 2 must run idle, interlocking means has been provided to prevent coupling of wheels 5a or 5b to countershaft 3 or wheels 5c or 5d to output shaft 2 when wheel 5i is coupled to supplementary shaft 11. For this purpose, the stem end of the drive key 7c projecting from the coil box 8c is provided with a sleeve 27 having an enlarged portion 27a and a portion 27b of reduced diameter. As shown in FIGS. 1, 2 and 5, a bracket 28 is mounted on the gear box 1 and pivotally mounted on the bracket 28 by screw threaded means 29 is an interlock plate 30 having an upstanding flange 31 provided with an elongated opening 32 for receiving the sleeve 27 on the key 7c. The end portions 32a of the opening 32 are of a width corresponding to the reduced diameter portion 27b of the sleeve 27 while the central portion 32b of the opening 32 is of a width corresponding to the enlarged portion 27a of the sleeve 27.

An arm 30a projects from the interlock plate 30 and a slot 33 in the end of arm 30a serves to receive a pin 34 projecting downwardly from the lever 24.

Figure 6:
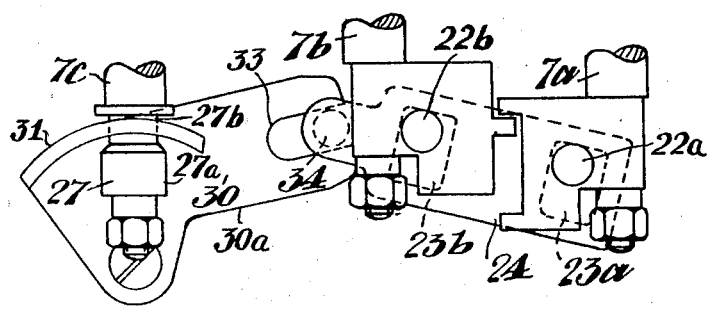
FIGURES 6 to 10 are plan views showing various positions of the locking arrangement for the gear shafts in conjunction with the blocking device for the supplementary shaft.

The operation of the interlocking means and the control of the wheels 5a, 5b, 5c and 5d in the right hand gear unit or assembly will now be described with reference to FIGS. 6 to 10. As shown in FIG. 6, the drive key 7b has been moved inwardly to couple the gear 5a to the countershaft 3 and in this position the drive key 7a is in neutral thereby leaving the gears 5c and 5d free to rotate on the output shaft 2. As shown in FIG. 6, movement of the drive key 7b inwardly causes pivotal movement of the lever 24 which in turn through the engagement of pin 34 with slot 33 in the arm 30a of the interlock plate 30 causes movement of the flange 31 on the plate 30 to a position in which the reduced portion 27b of the sleeve 27 on the drive key 7c is received in the reduced end portion 32a of the slot in the flange 31. This results in preventing movement of the key 7c thereby retaining the same in neutral position and permitting free rotation of the gear 5i on the supplementary shaft 11. Consequently, with the controls in the position shown in FIG. 6, the drive through the transmission will be from the left-hand gear unit or assembly through the supplementary gear 5i, the gear 4c and countershaft 3 and through the gear 5a to the gear 4a on the output shaft 2 from which power is delivered from the transmission.

Figure 7:
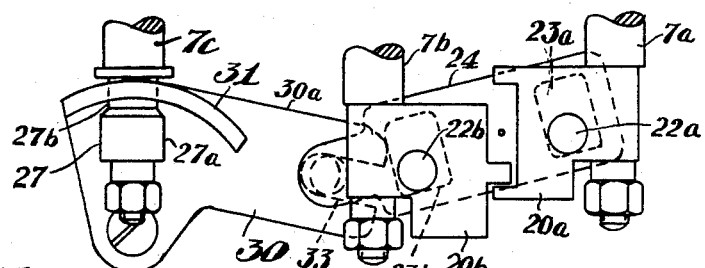

With reference to FIG. 7, the drive key 7b is shown in a position to couple the gear 5b to the countershaft 3 and the drive key 7a is in neutral to permit free rotation of the gears 5c and 5b on the output shaft 2. Operation of the lever 24, as well as the interlocking plate 30 causes the flange 31 to move to a position where the reduced portion 27b of the sleeve 27 on the drive key 7c is received in the reduced portion 32a of the slot in the flange 31 which likewise prevents operation of the drive key 7c and permits free rotation of the gear 5i on the supplementary shaft 11. In this condition of operation, the power will be transmitted from the input shaft 2' through the gear unit or assembly in the left hand side of the casing 1 through the supplementary gear 5i, the gear 4c on the countershaft 3 and the gear 5b to the gear 4b on the output shaft 2 from which power is delivered from the transmission.

Figure 8:
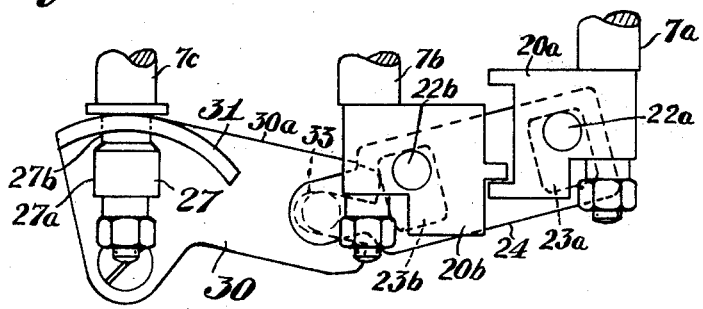

With reference to FIG. 8, the drive key 7b is shown in neutral position which permits free rotation of the gears 5a and 5b on the countershaft 3 and the drive key 7a has been moved inwardly to couple the gear 5c to the output shaft 2. In this position, operation of the lever 24 and arm 30a on the interlock plate 30 positions the flange 31 in such a manner that the reduced portion 27b of the sleeve 27 on the drive key 7c is received in the reduced portion 32a of the slot in the flange 31 which prevents operation of the drive key 7c thereby permitting free rotation of the gear 5i on the supplementary shaft 11. As a result, power will be delivered from the left hand gear unit or assembly through the supplementary gear 5i, the gear 4c on the countershaft 3 and the gear 5c to the output shaft 2, from which power will be delivered from the transmission.

Figure 9:
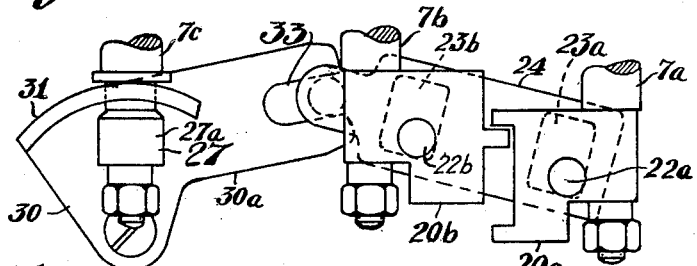

In FIG. 9, the drive key 7b is shown in neutral thereby permitting free rotation of the gears 5a and 5b on the countershaft 3 and the drive key 7a has been moved to a position to couple the gear 5d to the output shaft 2. This operation of the controls causes operation of the lever 24 which in turn through the arm 30a of the interlock plate 30, moves the flange 31 to a position where the reduced portion 27b of the sleeve 27 on the drive key 7c is received in the reduced portion 32a of the slot in the flange 31 thereby preventing operation of the drive key 7c and permitting free rotation of the supplementary gear 5i on the supplementary shaft 11. Consequently, power will flow from the left hand gear unit or assembly through the supplementary gear 5i, the gear 5c on the countershaft 3 and the gear 4d to the gear 5d on the output shaft 2 from which power will be delivered from the transmission.

Figure 10:
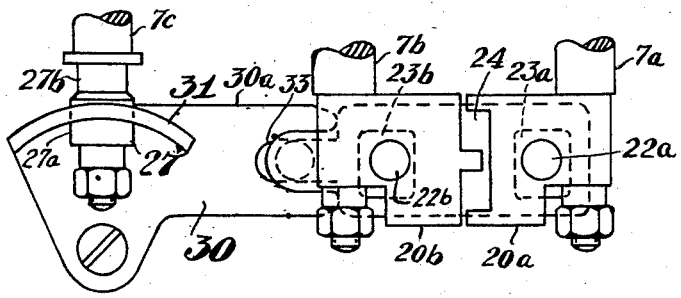

A still further condition may be provided by setting the controls as shown in FIG. 10, in which the drive keys 7a and 7b are in neutral thereby permitting free rotation of the gears 5a and 5b on the coutnershaft 3, as well as free rotation of the gears 5c and 5d on the output shaft 2. This position of the drive keys 7a and 7b causes the lever 24 through the arm 30a of the interlock plate 30 to move the flange 31 to a position where the sleeve 27 on the drive key 7c is received in the enlarged portion 32b of the slot in the flange 31 thereby permitting movement of the drive key 7c to couple the supplementary gear 5i to the supplementary shaft 11. Consequently, power will be transmitted from the input shaft 2' through the appropriate gears in the left hand gear unit or assembly and from the gear 4g on the countershaft 3' to the supplementary gear 5i, the power output in this case being taken from the supplementary shaft 11 and, of course, in this condition the right hand gear unit or assembly runs idle and transmits no power to the output shaft 2.

The above description indicates how the transmission of this invention may be utilized to provide sixteen gear ratios by utilizing both of the gear units or assemblies with power being transmitted from one to the other through the supplementary gear 5i or in which only the left hand gear unit or assembly need be utilized to provide eight different gear ratios with the power output being taken from the supplementary shaft 11, rather than from the power output shaft 2. It is, therefore, apparent that many different drive conditions may be provided by appropriate adjustment or control of the power transmission of this invention.

If desired, a second supplemental gear 5i' may be provided on the supplementary shaft 11 and this second supplemental gear 5i' would be operated in the same manner as the supplemental gear 5i in order to provide additional gear ratios.

As described above, the various drive keys may be operated by electro-magnet actuating means, but if desired as shown in FIG. 4, manual means may be provided for operating the individual drive keys and for this purpose, a fitting 27' may be provided on the stem end of the drive key 7c and received in an aperture 35 in the fitting 27' is a rod 36 to the end of which is secured a finger engaging knob 37. Consequently, it is only necessary to operate the drive key 7c or other appropriate drive keys by grasping the knob 37 and moving the key in either direction as required for the appropriate adjustment or setting of the transmission.

It will be seen that by the above described invention there has been provided a relatively simple, yet highly effective and versatile power transmission which serves to provide a large number of different gear ratios and which may be economically constructed by utilizing readily available power transmission units commonly employed in the transmissions of automotive vehicles.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A change speed power transmission comprising a casing, a power input shaft rotatably mounted in said casing, a pair of gears of different diameters freely rotatable on said shaft, means to selectively couple each of said gears to said shaft, a second pair of gears of different diameters fixed to said shaft, a countershaft rotatably mounted in said casing, a third pair of gears of different diameters freely rotatable on said countershaft, said third pair of gears meshing with said second pair of gears, means to selectively couple each of said third pair of gears to said countershaft, a fourth pair of gears fixed to said countershaft and meshing with said first pair of gears, a supplementary shaft rotatably mounted in said casing, a supplementary gear freely rotatable on said supplementary shaft and meshing with one of said fourth pair of gears, means to couple said supplementary gear to said supplementary shaft, power output means on said supplementary shaft, a second countershaft rotatably mounted in said casing, a fifth pair of gears of different diameters freely rotatable on said second countershaft, means to selectively couple each of said fifth pair of gears to said second countershaft, a sixth pair of gears of different diameters fixed to said second countershaft, said supplementary gear meshing with one of said sixth pair of gears, a power output shaft rotatably mounted in said casing, a seventh pair of gears of different diameters freely rotatable on said output shaft and meshing with said sixth pair of gears, means to selectively couple each of said seventh pair of gears to said output shaft and an eighth pair of gears of different diameters fixed to said output shaft and meshing with said fifth pair of gears, whereby with said supplementary gear freely rotatable on said supplementary shaft a maximum number of gear ratios is provided between said input and output shafts and with said supplementary gear coupled to said supplementary shaft and said fifth and seventh pair of gears freely rotatable on said second countershaft and said output shaft, one-half the maximum number of gear ratios will be provided between said input and said supplementary shaft for auxiliary power output from said supplementary shaft.

2. A power transmission as defined in claim 1, in which two supplementary freely rotatable gears of different diameters are provided on said supplementary shaft meshing with said fourth and sixth pairs of gears and means to selectively couple each of said supplementary gears to said supplementary shaft.

3. A power transmission as defined in claim 1, in which means is provided to prevent the simultaneous coupling of any of said first, third, fifth and seventh pairs of gears to said input shafts, said first and second countershafts and said output shaft respectively.

4. A power transmission as defined in claim 1, in which interlocking means is provided to prevent coupling of said supplementary gear to said supplementary shaft when any of said fifth or seventh pairs of gears are coupled to said second countershaft or said output shaft.

5. A power transmission as defined in claim 1, in which the means for selectively coupling the freely rotatable gears to the associated shafts comprises electro-magnets.

6. A power transmission as defined in claim 2, in which the means to selectively couple each of said supplementary gears to said supplementary shaft comprises a double acting electro-magnet.

7. A power transmission as defined in claim 1, in which each means for coupling the freely rotatable gears to the associated shafts include a manually operable rod having a finger engaging knob thereon.

References Cited in the file of this patent
UNITED STATES PATENTS
876,084    Parker _____ Jan. 7, 1908
FOREIGN PATENTS
1,060,214    Germany _____ June 25, 1959